US012612165B2

(12) United States Patent
Vollmer et al.

(10) Patent No.: US 12,612,165 B2
(45) Date of Patent: Apr. 28, 2026

(54) SEAT RAIL AND A SEAT MOUNTING SYSTEM FOR AN AIRCRAFT

(71) Applicants: Airbus Operations GmbH, Hamburg (DE); Airbus Operations SAS, Toulouse (FR); Airbus Operations Limited, Filton (GB)

(72) Inventors: Malte Vollmer, Hamburg (DE); Volker Robrecht, Hamburg (DE); Wolfgang Schulze, Hamburg (DE); Arnaud Tonnele, Toulouse (FR); Andy Dutton, Bristol (GB)

(73) Assignees: AIRBUS OPERATIONS LIMITED, Filton (GB); AIRBUS OPERATIONS GMBH, Hamburg (DE); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/814,718

(22) Filed: Aug. 26, 2024

(65) Prior Publication Data

US 2025/0074600 A1     Mar. 6, 2025

(30) Foreign Application Priority Data

Aug. 28, 2023    (EP) ..................................... 23193723

(51) Int. Cl.
B64D 11/06          (2006.01)

(52) U.S. Cl.
CPC ................................ B64D 11/0696 (2013.01)

(58) Field of Classification Search
CPC .............................. B64D 11/0696; B64C 1/18
See application file for complete search history.

(56) References Cited

U.S. PATENT DOCUMENTS

| | | | | |
|---|---|---|---|---|
| 3,570,415 A | * | 3/1971 | Drinnon | ................. B64D 9/003 248/501 |
| 2008/0197234 A1 | * | 8/2008 | Wilhelm | ............ B64D 11/0696 244/118.6 |
| 2019/0257331 A1 | * | 8/2019 | Benthien | ................... B64C 1/18 |

FOREIGN PATENT DOCUMENTS

| | | | |
|---|---|---|---|
| DE | 102007004554 A1 | 7/2008 | |
| DE | 102009028534 A1 * | 2/2011 | ......... B60N 2/01516 |
| FR | 1326559 A | 5/1963 | |

OTHER PUBLICATIONS

European Search Report for corresponding European Patent Application No. 23193723.6 dated Feb. 12, 2024.

* cited by examiner

*Primary Examiner* — Nicholas McFall
*Assistant Examiner* — Justin Michael Heston
(74) *Attorney, Agent, or Firm* — Greer, Burns & Crain, Ltd.

(57) ABSTRACT

A seat mounting system having a seat rail and a seat fitting, wherein the seat rail has an upper flange with a plurality of heads thereon. The seat fitting comprises a main body having a void configured to receive the upper flange and at least some of the plurality of heads.

10 Claims, 5 Drawing Sheets

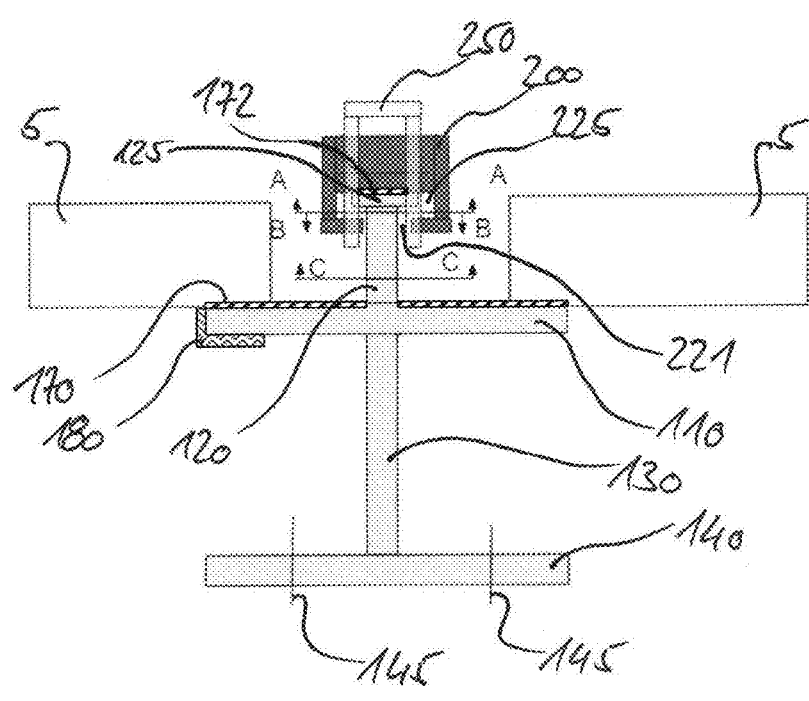
Figure 2
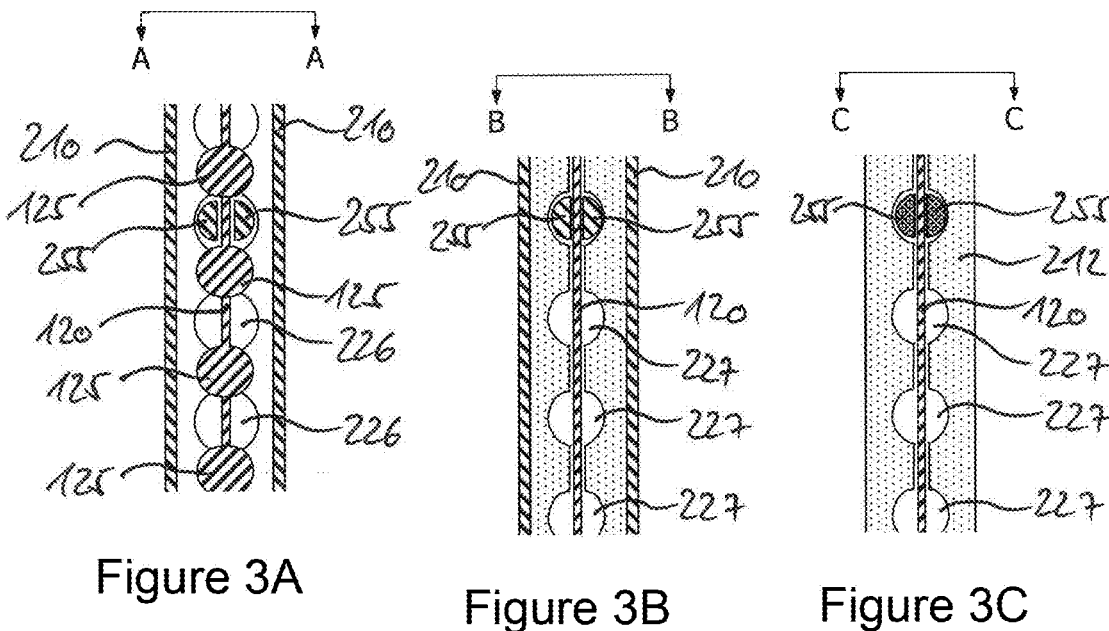
Figure 3A     Figure 3B     Figure 3C

SEAT RAIL AND A SEAT MOUNTING SYSTEM FOR AN AIRCRAFT

CROSS-REFERENCES TO RELATED APPLICATIONS

This application claims the benefit of European Patent Application Number 23193723.6 filed on Aug. 28, 2023, the entire disclosure of which is incorporated herein by way of reference.

FIELD OF THE INVENTION

The present disclosure generally relates to a seat rail and seat mounting system for an aircraft as well as an aircraft equipped with such device. Particularly, the present disclosure relates to a seat rail having an upper flange with a plurality of heads thereon, and further relates to a seat mounting system with such seat rail and a seat fitting with a void configured to receive the plurality of heads and the upper flange.

BACKGROUND OF THE INVENTION

A conventional seat rail comprises a longitudinal recess accessible via a plurality of openings in a top surface of the seat rail. The plurality of openings are arranged in a regular pattern, such as one opening per inch, with the longitudinal recess running continuously underneath. A fitting, for example, to mount a seat to the seat rail, has corresponding feet that can be inserted into some of the plurality of openings. Thereafter, the fitting is moved relative to the seat rail in the longitudinal recess, so that the feet overlap with a portion of the seat rail forming the openings, where the fitting can be securely fixed.

Other forms of seat rails have a flush upper surface in which a plurality of through holes are provided. An associated fitting has at least one pin to be introduced into one of the through holes, where the pin is fixed.

However, such seat rails are usually installed in a vehicle, where an exposure to liquids cannot be prevented. For instance, passengers can spill drinks, which may flow through the openings or through holes into an interior part of the seat rail or underneath the seat rail. Likewise, when cleaning the vehicle, liquids may be employed and can also reach a portion of the seat rail. For example, in case of a longitudinal recess in the seat rail, liquid can accumulate in the recess, where it is hard to be removed.

Thus, conventional seat rails may be effected by corrosion due to accumulated liquids.

SUMMARY OF THE INVENTION

It is therefore an object of the present disclosure to provide a seat rail with increased durability.

This object may be solved by the present invention as defined in one or more embodiments described herein.

According to a first aspect to better understand the present disclosure, a seat rail for an aircraft comprises a floor mount portion configured to have a floor of the aircraft mounted thereto, and an upper flange extending upwards from the floor mount portion and having an upper edge. The floor of the aircraft can be a topmost floor structure and/or a carpet or the like. This allows providing the seat rail in an upper region of the floor of the aircraft, for example, to be approximately flush with the walking surface of the floor.

The seat rail further comprises a plurality of heads at the upper edge of the upper flange. The plurality of heads is arranged regularly along a longitudinal direction of the upper flange. In other words, the upper flange extends in a longitudinal direction and protrudes upwards, in a cross-section of the seat rail, from the floor mount portion. The plurality of heads forms "mushroom heads" or small roofs on top of the flange.

Thus, the seat rail does not include a recess or similar void, where a liquid could accumulate and it is difficult to remove the liquid from the recess. The area between the floor mount and the flange can be open on at least two sides, i.e. in at least two directions, which guarantees good accessibility and avoids an encapsulated space.

As a mere example, the upper flange may extend from the floor mount portion in an approximately vertical direction, when the seat rail is installed in a vehicle. Likewise, the floor mount portion can exemplarily be arranged approximately horizontally. As a further example, the floor mount portion may have a slant or inclined upper surface, in order to allow any liquid to flow off the floor mount portion and, particularly, away from the upper flange.

In the present disclosure, terms such as "upper", "top", "bottom", "lower", "vertical", and "horizontal" are to be understood as referring to the seat rail when installed in a vehicle, particularly in a regular horizontally arranged floor of the vehicle.

In an implementation variant, the plurality of heads has a circular, elliptical, rectangular, or triangular shape. Furthermore, each of the plurality of heads is larger than a width of the upper flange, i.e., the size of the plurality of heads in a direction perpendicular to the longitudinal direction of the upper flange can be larger than the width of the upper flange in the same direction. Thus, the plurality of heads extends from the upper edge of the upper flange. Furthermore, at least some of the plurality of heads can extend from the upper edge of the upper flange in only one transverse direction, or in an opposite transverse direction or in both transverse directions. The transverse direction is substantially perpendicular to the longitudinal direction.

In another implementation variant, the seat rail can further comprise a main web arranged underneath the upper flange or having the upper flange integrated therein. The main web provides the main component of the seat rail arranged in the vertical direction. This provides a high rigidity and structural stability of the seat rail, particularly along the longitudinal direction. The upper flange can form part of this main web or extend the same upwards.

As the seat rail is intended to have at least one seat mounted thereon, such seat will introduce forces into the seat rail acting relative to the longitudinal direction of the seat rail, including lifting a portion of the seat rail and introducing a moment along the longitudinal direction (for example, in case of an acceleration and deceleration of the vehicle which acts on the mounted seat and, hence, on the seat rail). The main web can be designed to withstand these forces and moments. Likewise, the upper flange and the heads are designed to withstand the forces transferred from the seat and are designed to introduce the forces and moments into the main web.

In a further implementation variant, the seat rail can further comprise a mounting flange configured to mount the seat rail. For instance, the seat rail can be mounted to an associated structure of the floor structure of the vehicle, such as a longitudinal beam or the like.

Alternatively or additionally, the floor mount portion can extend on at least one side of the main web and/or of the upper flange. As a mere example, the floor mount portion can be arranged substantially perpendicular to the main web and/or the upper flange. The size of the floor mount portion is sufficient to provide any fastener or other means to attach a floor structure to the floor mount portion.

According to a second aspect to better understand the present disclosure, a seat mounting system comprises a seat rail of the first aspect or one or more of its variants.

In addition, the seat mounting system comprises a seat fitting configured to be coupled with the seat rail. The seat fitting comprises a main body having a longitudinally extending void with a cross-section including a horizontal slit and a vertical slit connecting the horizontal slit with a bottom surface of the main body. The horizontal slit (void portion) is sized to receive at least some of the plurality of heads of the seat rail. Likewise, the vertical slit (void portion) is sized to receive the upper flange of the seat rail.

Furthermore, the main body has at least one opening connecting the horizontal slit with the bottom surface of the main body, and each of the at least one opening is configured to receive one of the plurality of heads of the seat rail, and the vertical slit is configured to receive the upper flange of the seat rail.

Thus, the seat fitting can be placed on top of the seat rail in a state where the at least one opening in the seat fitting is in an overlapping manner with one of the heads of the seat rail, and the seat fitting is moved relative to the seat fitting until the head of the seat rail abuts against the ceiling of the horizontal slit (void portion) of the seat fitting. In this state, the seat fitting can slide along the seat rail, as the plurality of heads of the seat rail can be received in the horizontal slit (void portion) of the seat fitting and the upper flange of the seat rail can be received in the vertical slit (void portion) of the seat fitting. It is to be understood that the horizontal slit and the vertical slit has a certain extent in the longitudinal direction of the seat fitting to allow the sliding movement.

In an implementation variant, the seat mounting system can further comprise a locking device configured to lock the seat fitting to the seat rail when some of the plurality of heads of the seat rail are arranged in the vertical slit of the seat fitting in a manner not entirely overlapping with the at least one opening in the seat fitting. In other words, a portion of the seat fitting forming the bottom surface is arranged in an overlapping manner with one or more of the heads of the seat rail. This position may be achieved by placing the seat fitting onto the seat rail with a head of the seat rail being received in the at least one opening of the seat fitting and sliding the seat fitting along the seat rail for a distance smaller than a pitch of the heads, i.e. to a position between two adjacent heads.

It is to be understood that, if the seat fitting comprises more than one opening, a pitch of the opening, i.e. a distance between two adjacent openings, corresponds to the pitch of the heads. This allows placing the seat fitting onto the seat rail with a corresponding number of heads being received in a corresponding number of openings.

The overlapping state of the bottom portion of the seat fitting and the heads of the seat rail prevent the seat fitting from being lifted, i.e., pulled upwards away from the seat rail, as the seat fitting abuts against the lower surface of the corresponding heads. It is therefore sufficient for the locking device to prevent the seat fitting from sliding on the seat rail, i.e., from performing a movement along the longitudinal direction of the seat rail. The seat fitting in this locked position cannot be pulled away from the seat rail as described, and can also transfer any forces acting downwards on the seat fitting into the corresponding heads by abutting onto the upper surface of the heads.

As a mere example, the locking device can be arranged at one or both longitudinal ends of the seat fitting, and can be configured to block a longitudinal movement of the seat fitting. For instance, the locking device can be coupled to the seat rail, for example, at the upper flange and/or a head, in such a manner that the seat fitting abuts against the locking device.

In a further implementation variant, the seat fitting can comprise at least one through hole in the main body substantially perpendicular to the horizontal slit. The at least one through hole can reach from an upper surface of the main body down to the horizontal slit. Thus, a void is created in the seat fitting that extends from the upper surface of the main body in a vertical direction, where it merges the void of the horizontal slit.

As a mere example, the at least one through hole may be provided at an upper portion of the main body of the seat fitting corresponding to the at least one opening provided at the bottom portion of the main body. In other words, in a plan view one of the at least one through hole may overlap or coincide with one of the at least one opening. For instance, the at least one through hole and the at least one opening associated therewith can be congruent with one another.

Thus, the at least one opening together with the associated through hole can form a through hole through the entire main body and is substantially perpendicular to the horizontal slit.

The locking device can be configured to fit into one of the at least one through hole in the seat fitting, and to lock the seat fitting to the seat rail. Thus, the locking device can be arranged in an area adjacent to the upper flange of the seat rail.

As a mere example, if the locking device is placed into the at least one through hole, the locking device can abut against a circumferential edge of a head of the seat rail, if the seat fitting is slit along the seat rail. It is to be understood that depending on the size of the through hole and/or the size of the locking device, the locking device can abut against a circumferential edge of the head of the seat rail already, when the locking device is introduced into the through hole. For example, the locking device can be dimensioned to abut against the circumferential edge of each of the two adjacent heads of the seat rail.

In another implementation variant, the locking device can comprise at least one pin configured to fit into a portion of one of the at least one through hole in the seat fitting adjacent to the upper flange of the seat rail. Specifically, since the through hole can have a size corresponding to a head, the through hole will expose the upper edge of the upper flange, so that the locking device is to fit on one of the sides of the upper flange.

It is to be understood that the at least one through hole can be sized and formed not to expose the upper edge of the upper flange, i.e., the at least one through hole is mainly provided in the upper surface of the main body of the seat fitting and has a smaller area than the opening at the bottom surface of the main body. This allows the opening at the bottom side to be sufficiently large to receive a head, while the through hole on the upper side of the main body is sufficiently large to receive the locking device, such as the locking pin.

As a further example, the seat fitting may comprise two through holes at the upper surface of the main body, both through holes being associated with one opening at the corresponding bottom surface of the main body. Thus, the main body has an upper surface with two through holes and a bridge arranged between both through holes. Such bridge may be positioned above and aligned with the upper edge of the upper flange of the seat rail. This increases the structural stability of the seat fitting.

In yet another implementation variant, the at least one pin can fit into the portion of the through hole in a force fitting manner. Specifically, the force fitting of the at least one pin may include the at least one pin acting on an inner circumference of the through hole of the seat fitting and/or any portion of the upper flange and/or head and/or floor mount of the seat rail. Thus, a movement of the seat fitting along a longitudinal direction of the seat rail is blocked by the force fitted pin.

As a mere example, the at least one pin can be configured to expand in the through hole to achieve a force fitting connection with the seat rail and the seat fitting. For instance, the at least one pin can comprise a fastener that squeezes an elastic portion of the pin (e.g., in a vertical direction), so that this portion of the pin expands in a substantially horizontal direction. The expanded portion of the pin can then press or abut against the upper flange and/or head and/or floor mount of the seat rail as well as the inner surfaces of the main body of the seat fitting forming the void and/or the inner circumference of the at least one through hole. Particularly, pressing the expanded portion against the head of the seat rail allows securely blocking a movement of the seat fitting along the longitudinal direction of the seat rail.

In a further implementation variant, the seat fitting can comprise a seat mounting portion configured to have a seat mounted thereto. As a mere example, the seat mounting portion can extend from an upper surface of the main body of the seat fitting, and particularly can extend upwards from the main body.

Such seat mounting portion can have at least a part that corresponds to a conventional seat mounting portion. Thus, the disclosed seat rail and seat mounting system can be employed with any existing seat and conventional seat mounting measures.

It is to be understood that the present disclosure is not limited to seats to be mounted to the seat rail. As is well known, a seat rail can be employed to mount any device that requires fixation in an easy and fast manner, such as containers, beds, monuments, or the like.

In yet a further implementation variant, the seat mounting system can further comprise at least one filler that is configured to fill a gap between the upper flange of the seat rail and a side of a floor. In other words, the filler is provided at a top of the seat rail, where no seat fitting is arranged. The gap between the upper flange and the side of a floor is usually present, as the floor does not extend up to the upper flange, so that a seat fitting can easily be placed on top of the seat rail and moved longitudinally thereto.

In another implementation variant, the filler can be configured to cover the plurality of heads of the seat rail. Thus, the upper flange and the heads are protected from being damaged by any item hitting the seat rail.

According to a third aspect to better understand the present disclosure, an aircraft comprises at least one seat rail of the first aspect or one or more of its variants. Alternatively or additionally, the aircraft comprises at least one seat mounting system of the second aspect or one or more of its variants.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which:

FIG. 2 schematically illustrates a cross-section through seat mounting system and floor;

FIG. 3A schematically illustrates cross-sectional views A-A of FIG. 2,

FIG. 3B schematically illustrates cross-sectional views B-B of FIG. 2,

FIG. 3C schematically illustrates cross-sectional views C-C of FIG. 2,

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
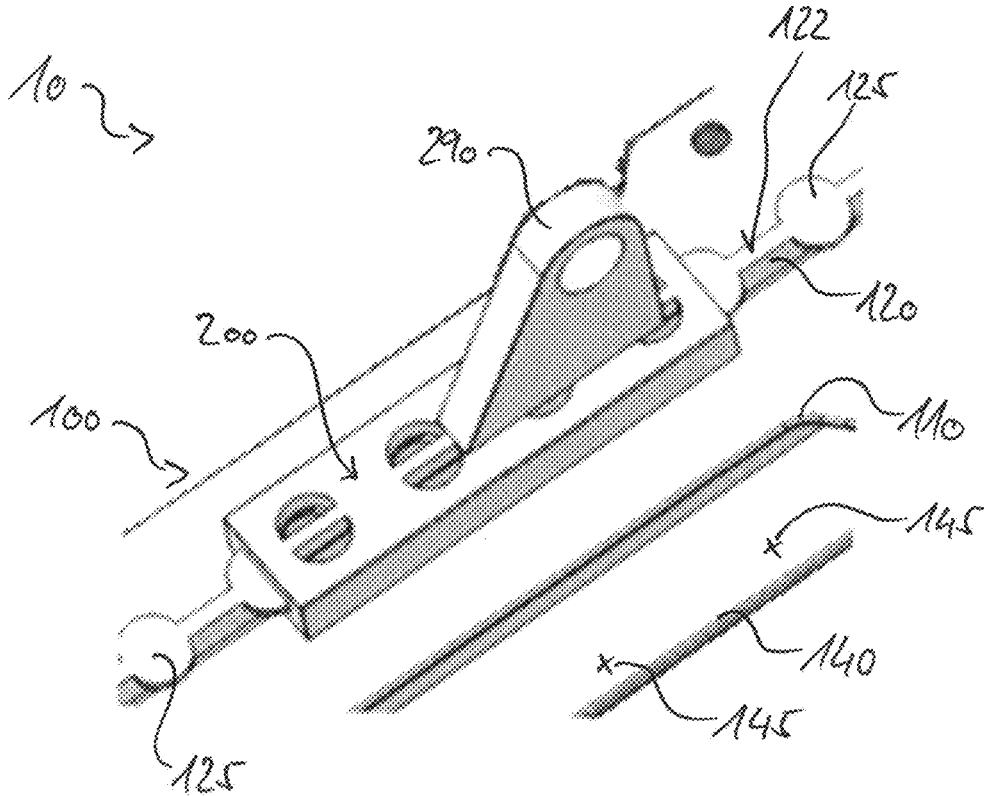
FIG. 1 schematically illustrates an exemplary seat mounting system.

FIG. 1 schematically illustrates an exemplary seat mounting system 10 including a seat rail 100 and a seat fitting 200 placed thereon.

The seat rail 100 comprises a floor mount portion 110 configured to have a floor 5 (FIG. 3) of the aircraft 1 mounted thereto, and an upper flange 120 extending upwards from the floor mount portion 110. The seat rail 100 further comprises a mounting flange 140 configured to mount the seat rail 100. As a mere example, fasteners 145 can be employed to mount the seat rail 100 to an aircraft structure (not illustrated).

Figure 6:
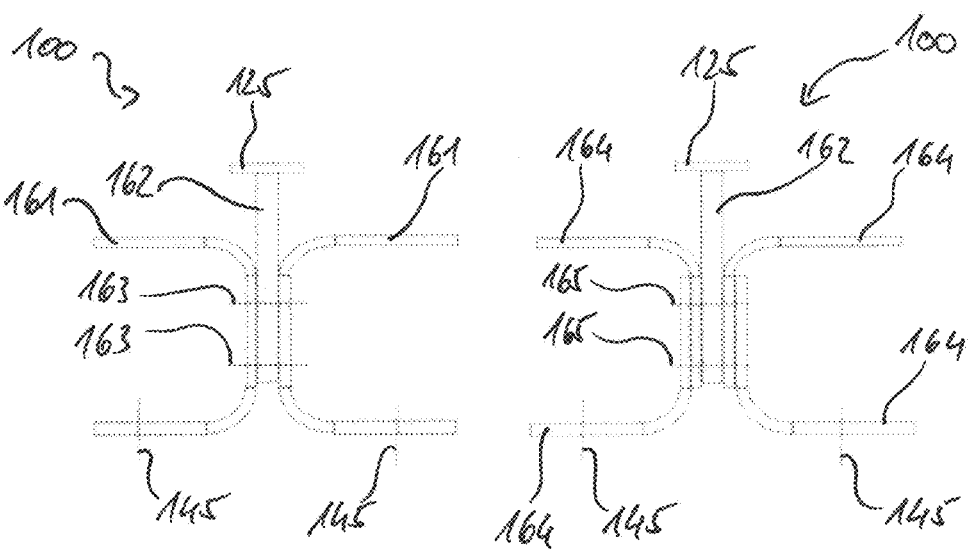
FIG. 6 schematically illustrates cross sections of two further exemplary seat rails.

Between floor mount portion 110 and the mounting flange 140 can be a main web 130 (FIGS. 2 and 6). The main web 130 can be arranged underneath the upper flange 120. The upper flange 120 can be integrated into the main web 130. The present disclosure is not restricted to the specifically illustrated cross-sectional form of the seat rail 100.

The upper flange 120 has an upper edge 122, at which a plurality of heads 125 are arranged. As a mere example, the heads 125 can be integrated into the upper flange 120, i.e. are formed from the same material. This forming, for example, can take place by milling or otherwise machining a raw rail (not illustrated).

The plurality of heads 125 are arranged regularly along a longitudinal direction of the upper flange 120. The longitudinal direction corresponds to the longitudinal direction of the seat rail 100. For instance, a distance between two adjacent heads can be half an inch, 1 inch, 2 inches, etc., It is to be understood that the distance between two adjacent heads does not restrict the scope of the present disclosure. However, an established usual pitch of seat mounting possibilities is 1 inch.

The seat fitting 200 can be placed on top of the seat rail 100, particularly on top of the upper flange 120 and heads 125 as will be described in more detail with respect to FIGS. 2 to 5.

The seat fitting 200 is configured to be coupled with the seat rail 100, and comprises a main body 210 having a longitudinally extending void 220. The void 220 begins at one longitudinal end of the main body 210 of the seat fitting 200 and has a length in the longitudinal direction smaller than or equal to the longitudinal length of main body 210. Thus, the void 220 can run entirely through the main body 210 in the longitudinal direction.

The void 220 has a cross-section comprising a horizontal slit 225, which is arranged inside of the cross-section of the main body 210. In other words, the horizontal slit 225 does not pierce through a lateral side of the main body 210. The cross-section of the void 220 further comprises a vertical slit 221 connecting the horizontal slit 225 with a bottom surface 212 of the main body 210. Thus, the cross-section of the void 220 can have a T-shape, which is inside of the cross-section of the main body 210 with the exception of the bottom area of the vertical slit 221 piercing through the bottom surface 212.

The void 220 is configured to receive the upper flange 120 and heads 125 of the seat rail 100. As a mere example, as can be derived from FIGS. 2 and 4, if a longitudinal end of the upper flange 120 would be accessible, the seat fitting 200 could be "threaded" onto the upper flange 120 and heads 125. Since the seat rail 100 usually extends over a long portion of the vehicle, such "threading" of the seat fitting 200 onto the seat rail 100 would be cumbersome.

Figure 4:
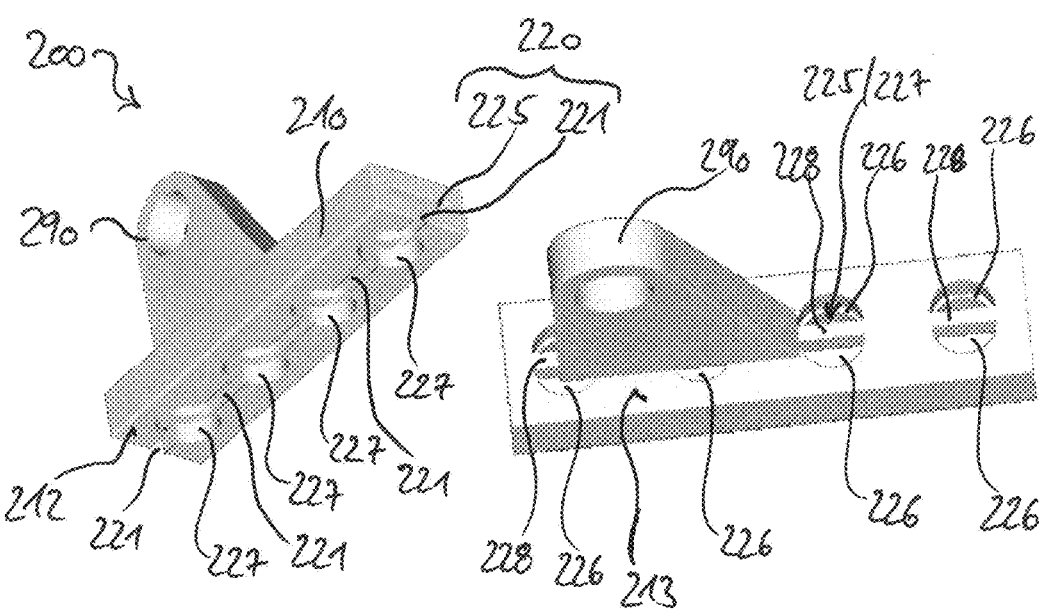
FIG. 4 schematically illustrates a seat fitting from two perspectives.

Therefore, the main body of the seat fitting 200 has at least one opening 227 connecting the horizontal slit 225 with the bottom surface 212 of the main body 210. Each of the at least one opening 227 is configured to receive one of the plurality of heads 125 of the seat rail 100. As a mere example, FIG. 4 illustrates four openings 227 at the bottom surface 212. It is to be understood that any number of openings 227, including one opening 227 and more than four openings 227, can be provided in the seat fitting 200.

A pitch of the openings 227 corresponds to a pitch of the heads 125. This allows placing the seat fitting 200 onto the seat rail 100 in a manner, where each of the at least one opening 227 receives one of the plurality of heads. This can be performed, until the heads 125 abut against an upper ceiling of the horizontal slit 225. The vertical slit 221 is configured to receive the upper flange 120 of the seat rail 100, particularly in the situation, where the heads 125 are arranged in the horizontal slit 225. In this configuration, the seat fitting 200 can slide along the longitudinal direction of the seat rail, since the heads 125 can slide in the horizontal slit 225 and the upper flange 120 can slide in the vertical slit 221 (and also in the at least one opening 227).

It is to be understood that the cross-section of the void 220 may have a different shape than a T-shaped, if the upper flange 120 and the heads 125 have a different cross-sectional shape. In order to allow the sliding movement of the seat fitting 200, the cross sections of the void 220 and the upper flange 120 with the heads 125 shall correspond.

The bottom surface 212 of the main body 210 comprises areas between openings 227 and adjacent to the vertical slit 221, which overlap with a head 125, if the seat fitting 200 is slit along the seat rail 100. This overlapping state can be particularly derived from FIGS. 2 and 3. In such state, where portions of the bottom of the main body 210 overlap with the underside of the heads 125, the seat fitting 200 cannot be taken away (lifted) from the seat rail 100. Thus, the seat fitting 200 can be used to mount any component, e.g., a seat, a bed, a container, a monument, etc. to the seat rail 100. To do so, the seat fitting 200 can comprise a seat mounting portion 290. Such seat mounting portion 290, particularly its upper end, can be formed in a conventional manner.

FIG. 3A to 3C schematically illustrates the cross-sectional (plan) views A-A, B-B, C-C of FIG. 2, respectively. Specifically, in the cross-section A-A of FIG. 3A the ceiling of the void 220, particularly the horizontal slit 225, can be seen between the lateral side portions of the main body 210. This ceiling is open at the through holes 226, through which a locking device 255 can be inserted as will be explained with respect to FIGS. 4 and 5. The heads 125 of the seat rail 100 are in a position where they do not overlap with the through holes 226. For instance, the heads 125 can abut against the ceiling of the horizontal slit 225.

The cross-section B-B of FIG. 3B also shows the lateral side portions of the main body 210 and the inner side of the void 220 in the main body, i.e., the bottom of the horizontal slit 225. As can be derived, the upper flange 120 of the seat rail 100 is arranged flush positioned in the vertical slit 221 and the openings 227.

The cross-section C-C of FIG. 3C illustrates the bottom surface 212 of the main body 210 as well as the underside of the locking devices 255. The upper flange 120 is also cut and visible similar to the cross-section B-B.

In order to prevent the seat fitting 200 from sliding along the seat rail 100 (particularly in the overlapping state), a locking device 250 can be provided that blocks the seat fitting 200 relative to the seat rail 100.

Figure 5:
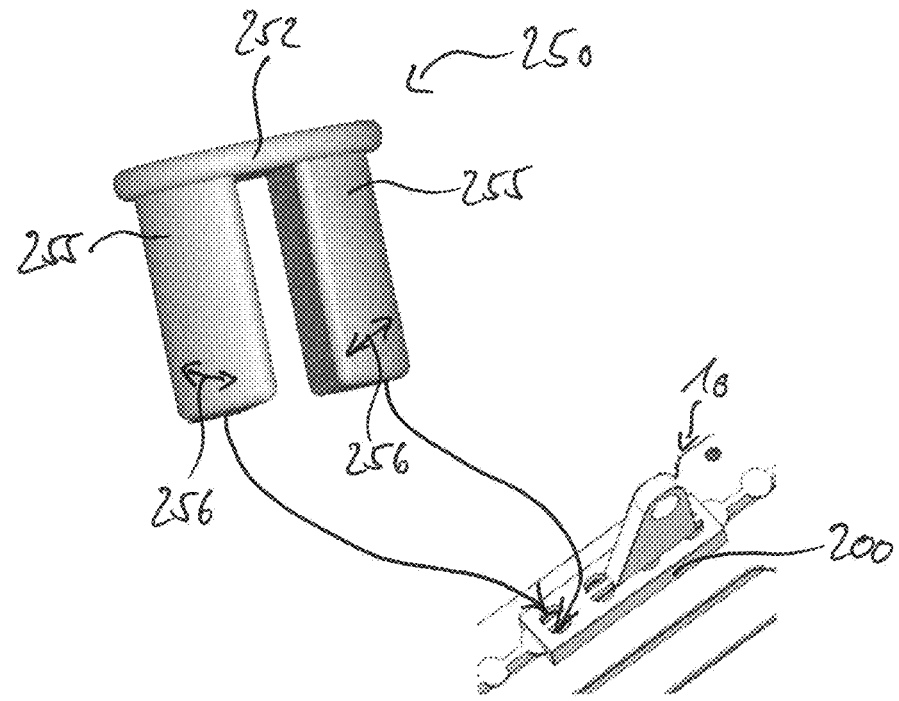
FIG. 5 schematically illustrates a locking device relative to a seat mounting system.

With reference to FIGS. 4 and 5 the seat fitting 200 can comprise at least one through hole 226 in the main body 210, particularly in an upper surface 213 of the main body 210. The at least one through hole 226 is substantially perpendicular to the horizontal slit 225 and goes through the upper portion of the main body 210 into the horizontal slit 225. As a mere example, the at least one through hole 226 can be arranged in a manner corresponding with an opening 227 at the bottom portion of the main body 210, so that the hole 226 and opening 227 together form a through hole through the entire main body 210 in a vertical direction.

FIG. 4 illustrates a plurality of through holes 226, having a pitch in the longitudinal direction of the seat fitting 200 corresponding to the pitch of the openings 227 at the bottom thereof. In addition, an exemplary bridge 228 can be formed in the longitudinal direction between two through holes 226. The present disclosure is not restricted to the presence of such bridge 228. However, the bridge 228 increases structural stability of the seat fitting 200, particularly in the longitudinal direction, and further facilitates locking the seat fitting 200 as will be described with respect to FIG. 5.

In order to prevent the seat fitting 200 from sliding along the seat rail 100 (particularly in the overlapping state), a locking device 250 can be provided that blocks the seat fitting 200 relative to the seat rail 100.

As can be derived from FIG. 5, a locking device 250 can be provided that is configured to fit into the at least one through hole 226 in the seat fitting 200. The illustrated locking device 250 is adapted to the configuration of the seat fitting 200, in accordance with FIG. 4, i.e. having a bridge 228. Thus, the locking device 250 can have two pins 255 and a cap 252, wherein each pin 255 is configured to fit into one through hole 226.

When the seat fitting 200 is in the overlapping state with the seat rail 100, the through holes 226 (and the corresponding openings 227) do not (entirely) overlap with a head 125 of the seat rail 100. Thus, inserting the locking device 250, i.e., a pin 255, into a through hole 226 brings the pin 255 in a position adjacent to the upper flange 120 between two adjacent heads 125. This can be derived from the cross-sectional views of FIG. 3. In this configuration, the seat fitting 200 cannot slide along the seat rail 100, as the seat fitting 200 abuts against the locking pin(s) 255 and the locking pin(s) 255 abuts against a head 125.

Referring back to FIG. 3, this drawing schematically illustrates the cross-sectional (plan) views A-A, B-B, C-C of FIG. 2. Specifically, in the cross-section A-A the ceiling of the void 220, particularly the horizontal slit 225, can be seen between the lateral side portions of the main body 210. This ceiling is open at the through holes 226, through which the locking device 255 can be inserted. The heads 125 of the seat rail 100 are in a position where they do not overlap with the through holes 226. For instance, the heads 125 can abut against the ceiling of the horizontal slit 225.

The cross-section B-B also shows the lateral side portions of the main body 210 and the inner side of the void 220 in the main body, i.e., the bottom of the horizontal slit 225. As can be derived, the upper flange 120 of the seat rail 100 is arranged flush positioned in the vertical slit 221 and the openings 227.

The cross-section C-C illustrates the bottom surface 212 of the main body 210 as well as the underside of the locking devices 255. The upper flange 120 is also cut and visible similar to the cross-section B-B.

It is to be understood that the locking pin 255 can extend into the opening 227 and even reach through the bottom portion of the main body 210 of the seat fitting 200, as it is illustrated in FIG. 2. Thus, the locking pin 255 extends beyond the bottom surface 212 of the main body 210 when viewing from the top to the bottom.

In order to additionally secure the locking device in the through hole 226, the locking device 250, particularly at least one of its pins 255, can be configured to fit into the through hole 226 (and opening 227) in a force fitting manner. Furthermore, at least one of the pins 255 can be configured to be expanded, illustrated by the double arrows 256 in FIG. 5. Such expansion of a portion of the at least one pin 255 squeezes the material of the pin 255 into the void 220 and into the space around the upper flange 120 and the heads 125. Thus, any sliding of the seat fitting 200 can be securely avoided, and the locking device 250 cannot be pulled out of the through hole 226. The expansion can be achieved by arranging a fastener inside of the pin that, when fastening (such as rotating), raises the bottom of the pin towards the cap 252. This squeezes the (elastic) material of the pin 255 and fills out the void 220. Instead of an elastic squeezing the pin may also be plastically deformed.

Alternatively, instead of an expansion of the at least one pin 255, the pin 255 may comprise one or more elements (not illustrated) that can be brought into a protruding state, where they protrude substantially perpendicular to the longitudinal direction of the pin 255. For instance, one or more balls on a biasing element may be provided, that stick out at lateral sides of the pin 255 in a manner, where they block the pin 255 form being pulled out of the through hole 226. Only if the pulling force exceeds a particular threshold pressing the one or more elements inside of the pin 255, the pin turnip 55 may be pulled out of the through hole 226.

Again with respect to FIG. 2, it can be derived that the vertical extent of the upper flange 120 (and the head 125) can correspond to a floor 5 mounted adjacent to the seat rail 100 and onto the floor mount portion 110. Thus, the seat rail 100 can be adapted to the floor 5 into which the seat rail 100 should be spatially integrated.

The seat rail profile 100 can be protected by an additional layer on top of the floor mount portion 110 (also referred to as a floor panel flange). This additional layer can be a glass ply, a sealing tape, a titanium foil and/or an abrasive paint. Thus, additional protection of the material of the seat rail 100 can be provided.

Likewise, a sliding pad 172 can be provided on top of the heads 125 and/or on the upper edge 122. The sliding pad 172, for example, can be made from Teflon (PTFE) or other material capable of reducing abrasion of the surface of the seat rail 100.

FIG. 2 further illustrates an exemplary clip 180 configured to couple the floor 5 to the floor mount portion 110. It is to be understood that a similar clip 180 can be provided on the opposite side, but has been omitted in the drawing for brevity reasons.

FIG. 6 schematically illustrates two cross sections of further exemplary seat rails 100. The left seat rail 100 is made from two U-shaped rails 161 arranged with their open ends towards opposite lateral sides of the seat rail 100, and a main web 162. This particular main web 162 integrates the upper flange 120. In other words, compared to the seat rail 100 of FIG. 2, the main web 162 integrates a main web 130 and an upper flange 120 into one piece. The heads 125 may be supplemented onto or integrated into the main web 162. The U-shaped rails 161 and the main web 162 can be mounted together by fasteners 163. Alternatively, these seat rail components can be welded or adhered to one another.

The right seat rail 100 in FIG. 6 is made from four L-shaped rails 164, where one flange of all L-shaped rails 164 is brought into an overlapping manner. These overlapping flanges are fastened to one another, for example with fasteners 165, or by welding or adhering. The upper flange 120 (not explicitly illustrated in FIG. 6) may be arranged on top of such four L-shaped rails 164 mounted together. Alternatively, as illustrated in FIG. 6, a main web 162 may be used that is the same as in the left example of FIG. 6. In this case, the main web 162 can be provided between two pairs of two L-shaped rails 164 as illustrated.

Figure 7:
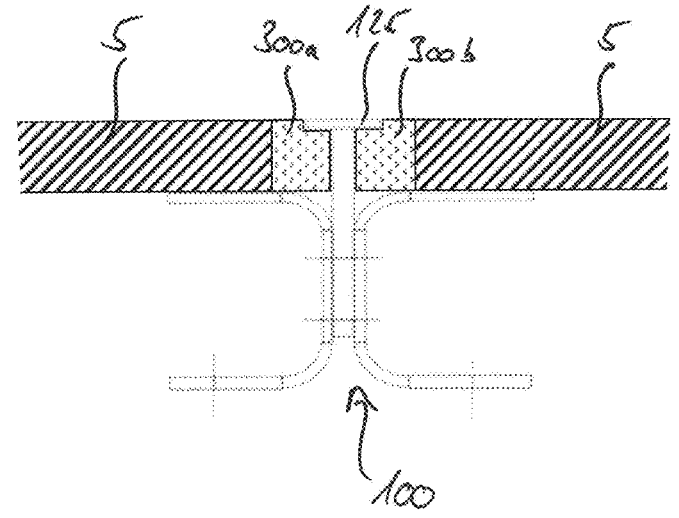
FIG. 7 schematically illustrates an exemplary seat rail.

FIG. 7 schematically illustrates an exemplary seat rail 100. Although the left example of FIG. 6 is illustrated, any seat rail 100 configuration can be used. The seat mounting system 10 can further comprise a filler 300 that is configured to fill a gap between the upper flange 120 of the seat rail 100 and a lateral side of the floor 5. Thus, one filler 300 can be arranged on each side of the upper flange 120, or in other words the upper flange 120 divides the gap between both floor portions 5 and the two gap parts are each filled by one filler 300a, 300b. Alternatively, the filler 300 also covers the upper surface of the heads 125, i.e. spans over the upper flange 120 and heads 125 (this configuration is not illustrated).

Figure 8:
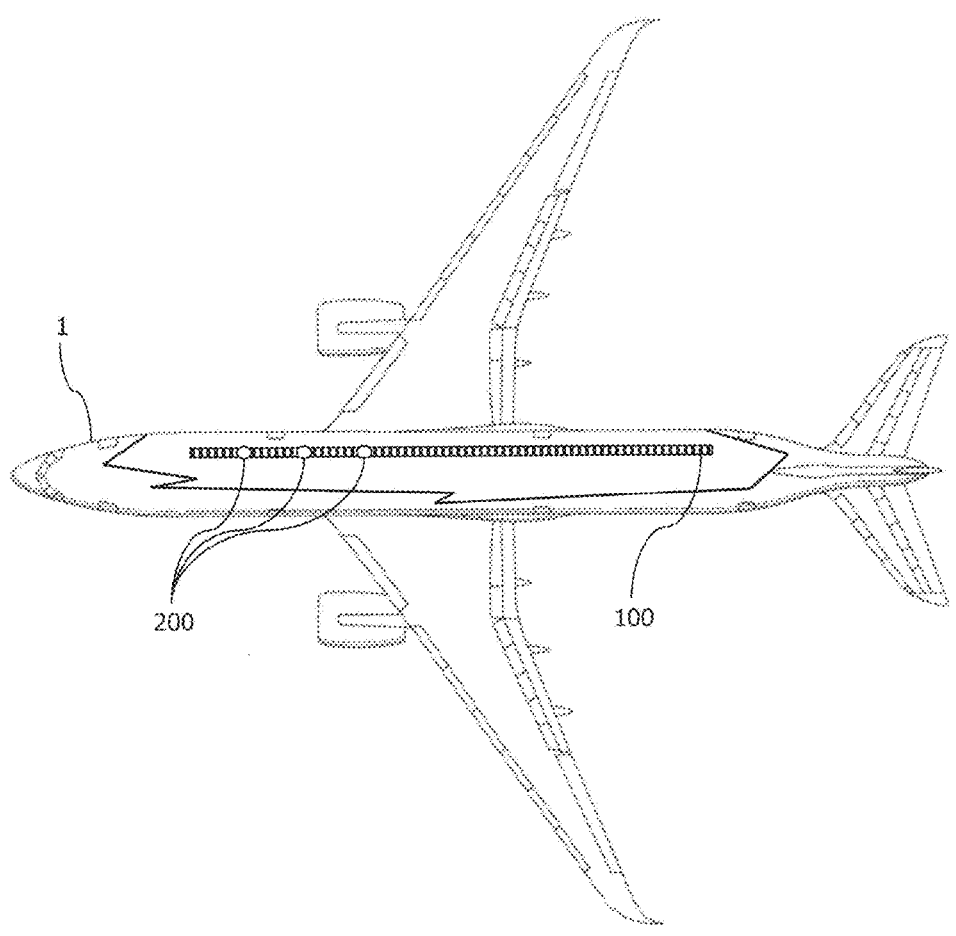
FIG. 8 schematically illustrates an aircraft comprising a seat mounting system.

FIG. 8 schematically illustrates an aircraft 1 comprising at least one seat mounting system 10. The seat rail 100 of the seat mounting system 10 can extend over a large portion of the aircraft 1 in a longitudinal direction of the aircraft 1.

It is to be understood that a plurality of seat rails 100 can be provided in the aircraft 1. As a mere example, two seat rails 100 parallel to one another can be installed for each seat row (not illustrated) to be installed in the aircraft 1.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A seat mounting system, comprising:
a seat rail, the seat rail comprising:
a floor mount portion configured to have a floor of an aircraft mounted thereto;
an upper flange extending upwards from the floor mount portion and having an upper edge; and
a plurality of heads at the upper edge of the upper flange, the plurality of heads being arranged regularly along a longitudinal direction of the upper flange, the seat mounting system further comprising:
a seat fitting configured to be coupled with the seat rail,
wherein the seat fitting comprises a main body having a longitudinally extending void with a cross-section including a horizontal slit and a vertical slit connecting the horizontal slit with a bottom surface of the main body,
wherein the main body has at least one opening forming an interruption in the vertical slit and connecting the horizontal slit with the bottom surface of the main body,
wherein each of the at least one opening is configured to receive one of the plurality of heads of the seat rail therethrough, and the vertical slit is configured to receive the upper flange of the seat rail, and
a locking device configured to lock the seat fitting to the seat rail when some of the plurality of heads of the seat rail are arranged in the horizontal slit of the seat fitting in a manner not entirely overlapping with the at least one opening in the seat fitting,
wherein the seat fitting comprises a pair of side-by-side though holes separated by a bridge in a top surface of the main body substantially perpendicular to the horizontal slit, and
wherein the locking device is configured to fit into each through hole in the pair of through holes in the seat fitting between adjacent heads of the plurality of heads, and to lock the seat fitting to the seat rail.

2. The seat mounting system of claim 1, wherein the locking device comprises at least one pin configured to fit into a portion of the at least one through hole in the seat fitting and at least in the horizontal slit adjacent to the upper flange of the seat rail.

3. The seat mounting system of claim 2, wherein the at least one pin fits into the portion of the at least one through hole in a force fitting manner.

4. The seat mounting system of claim 3, wherein, the at least one pin is configured to expand to achieve a force fitting connection with the seat rail and the seat fitting.

5. The seat mounting system of claim 1, further comprising:
at least one filler that is configured to fill a gap between the upper flange of the seat rail and a side of a floor.

6. The seat mounting system of claim 5, wherein the filler is configured to cover the plurality of heads of the seat rail.

7. The seat mounting system of claim 1, wherein the plurality of heads has a circular, elliptical, rectangular, or triangular shape, and
wherein each of the plurality of heads is larger than a width of the upper flange.

8. The seat mounting system of claim 1, wherein the seat rail further comprises:
a main web arranged underneath the upper flange or having the upper flange integrated therein;
a mounting flange configured to mount the seat rail;
wherein the floor mount portion extends on at least one side of the main web, the upper flange, or both; or
any combination thereof.

9. The seat mounting system of claim 1, wherein the seat fitting comprises a seat mounting portion configured to have a seat mounted thereto.

10. An aircraft, comprising:
the seat mounting system of claim 1.

* * * * *